(12) United States Patent
Brown et al.

(10) Patent No.: US 7,245,790 B2
(45) Date of Patent: Jul. 17, 2007

(54) SYSTEM AND METHOD FOR RESOLUTION ENHANCEMENT OF A DISTRIBUTED SENSOR

(75) Inventors: Anthony Brown, Fredericton (CA); Bruce Colpitts, Fredericton (CA); Kellie A. S. Brown, Fredericton (CA)

(73) Assignee: University of New Brunswick, New Brunswick (CA)

( * ) Notice: Subject to any disclaimer, the term of this patent is extended or adjusted under 35 U.S.C. 154(b) by 56 days.

(21) Appl. No.: 11/087,828

(22) Filed: Mar. 24, 2005

(65) Prior Publication Data

US 2005/0213869 A1 Sep. 29, 2005

Related U.S. Application Data

(60) Provisional application No. 60/587,499, filed on Jul. 14, 2004, provisional application No. 60/556,374, filed on Mar. 26, 2004.

(51) Int. Cl.
*G02B 6/00* (2006.01)
(52) U.S. Cl. ........................................ 385/12
(58) Field of Classification Search .................. 385/12
See application file for complete search history.

(56) References Cited

U.S. PATENT DOCUMENTS 4,997,277 A * 3/1991 Horiguchi et al. ......... 356/73.1
7,170,590 B2 * 1/2007 Kishida ......................... 356/32
2003/0174924 A1 * 9/2003 Tennyson ..................... 385/12
2006/0018586 A1 * 1/2006 Kishida .......................... 385/12
2006/0109451 A1 * 5/2006 Lopez et al. ................ 356/73.1

FOREIGN PATENT DOCUMENTS

CA 2 422 272 A1 9/2003
WO WO 03/078932 A1 9/2003

OTHER PUBLICATIONS

Fellay, A. et al., Distributed sensing using stimulated Brillouin scattering : towards ultimate resolution, OSA Technical Digest Series, v. 16, 1997, pp. 324-327.

(Continued)

*Primary Examiner*—Ellen E. Kim
(74) *Attorney, Agent, or Firm*—Blank Rome LLP

(57) ABSTRACT

A Brillouin Optical Time-Domain Analysis (BOTDA) distributed sensor system and method use a continuous wave (cw) Stokes wave interrupted with a dark pulse for improved spatial resolution. The cw Stokes wave causes a continuous depletion of the pump wave. The dark pulse causes the depletion to stop for the duration of the pulse. Brillouin interactions are measured during the dark pulse. Very narrow dark pulses can be used because sufficient Stokes wave energy is maintained. The system produces a stronger time-domain signal and narrower linewidth Brillouin spectra than traditional techniques using a bright Stokes pulse. Narrower measurement pulses can be used leading to improved spatial resolution. A quasi-cw Stokes wave can be used to reduce the effect of stimulated Brillouin scattering (SBS) in long measurement fibers. The system can be used for distributed strain or temperature measurements.

30 Claims, 4 Drawing Sheets

OTHER PUBLICATIONS

Bao, X. et al., Characterization of the Brillouin-loss spectrum of single-mode fibers by use of very short et al., Optics Letter, vol. 24, No. 8, Apr. 15, 1999, pp. 510-512.

Brown, Anthony W. et al., Spatial Resolution Enhancement of a Brillouin-Distributed Sensor et al., Journal of Lightwave Technology, vol. 17, No. 7, Jul. 1999, pp. 1179-1183.

Brown, Anthony W. et al., Brillouin Scattering Based Distributed Sensors et al., Journal of Intelligent Material Systems and Structures, vol. 10, Apr. 1999, pp. 340-349.

Garus, Deiter et al., Brillouin Optical-Fiber Frequency-Domain et al., Journal of Lightwave Technology, vol. 15, No. 4, Apr. 1997, pp. 654-662.

Hotate, Kazuo et al., Distributed Fiber Brillouin Strain Sensing et al., IEEE Photonics Technology Letters, vol. 14, No. 2, Feb. 2002, pp. 179-181.

Afshar, Shahraam V. et al., Optics Letters, vol. 28, No. 16, Aug. 15, 2003, pp. 1418-1420.

Lecoeuche, V. et al., Transient Response in high-resolution Brillouin-based et al., Optics Letters, vol. 25, No. 3, Feb. 1, 2000.

Shiraki, Kazuyuki et al., SBS Threshold of a Fiber with a Brillouin Fequence Shift Distribution, Journal of Lightwave Technology, vol. 14, No. 1, Jan. 1996, pp. 50-57.

* cited by examiner

SYSTEM AND METHOD FOR RESOLUTION ENHANCEMENT OF A DISTRIBUTED SENSOR

CROSS-REFERENCE TO RELATED APPLICATIONS

This application claims the benefit of U.S. provisional patent application 60/556,374, filed Mar. 26, 2004 and 60/587,499 filed Jul. 14, 2004.

MICROFICHE APPENDIX

Not Applicable.

TECHNICAL FIELD

The present invention relates to a system and method for resolution enhancement of a distributed sensor and, in particular, resolution enhancement of a Brillouin distributed sensor.

BACKGROUND OF THE INVENTION

The spatial resolution of a conventional Brillouin Optical Time-Domain Analysis (BOTDA) distributed sensor system is generally limited by a combination of linewidth broadening and reduced signal strength associated with the use of short optical pulses [See Fellay, A., Thévenaz, L., Facchini, M., Niklès, M., and Robert, P., "Distributed sensing using stimulated Brillouin scattering: towards ultimate resolution", OFS'96, pp. 324-327, 1996 and Bao, X., Brown, A., DeMerchant, M., and Smith, J., "Characterization of the Brillouin-loss spectrum of single-mode fibers by use of very short (<10-ns) pulses", Optics Letters, Vol. 24, No. 8, pp. 510-512, 1999]. Maximum spatial resolutions of 1 m are typical of such systems, although some progress has been made toward further enhancements [See Bao, X., Brown, A., DeMerchant, M., and Smith, J., "Characterization of the Brillouin-loss spectrum of single-mode fibers by use of very short (<10-ns) pulses", Optics Letters, Vol. 24, No. 8, pp. 510-512, 1999.; Brown, A. W., DeMerchant, M. D., Bao, X., and Bremner, T. W., "Spatial resolution enhancement of a Brillouin-distributed sensor using a novel signal processing method", Journal of Lightwave Technology, Vol. 17, No. 7, pp. 1179-1183, 1999 and Brown, A. W., Smith, J. P., Bao, X., DeMerchant, M. D., and Bremner, T. W., "Brillouin scattering based distributed sensors for structural applications", Journal of Intelligent Materials Systems and Structures, Vol. 10, pp. 340-349, 1999.] with a resolution in the 500 to 100 mm range having been reported.

For this reason, other methods such as frequency-domain reflectometry [See Garus, D., Gogolla, T., Krebber, K., and Schliep, F., "Brillouin optical-fiber frequency-domain analysis for distributed temperature and strain measurements", Journal of Lightwave Technology, Vol. 15, No. 4, pp. 654-662, 1997] and correlation-based methods [See Hotate, K., and Tanaka, M., "Distributed fiber Brillouin strain sensing with 1-cm spatial resolution by correlation-based continuous-wave technique", IEEE Photonics Technology Letters, Vol. 14, No. 2, pp. 179-181, 2002] have been proposed to obtain higher resolution. In both cases, however, improved resolution has come at the cost of acquisition speed and/or overall sensing length. There is a need, therefore, for a system and method of obtaining centimeter resolution from a time-domain pump and probe configuration that does not compromise acquisition speed or sensing length.

SUMMARY OF THE INVENTION

It is therefore an object of the present invention to provide a time-domain pump and probe configuration with improved resolution without compromising acquisition speed or sensing length.

Accordingly, an aspect of the present invention provides a Brillouin Optical Time-Domain Analysis (BOTDA) distributed sensor system having: an optical fiber distributed sensor; a first launching means for launching a first optical radiation in a first direction in the optical fiber; a second launching means for launching a second optical radiation in an opposing direction in the optical fiber; and a measurement means for measuring the Brillouin interaction of the first and second optical radiation. The first launching means is operable to interrupt said first optical radiation with a dark pulse and the measurement means measures the Brillouin interaction during the dark pulse.

In some embodiments, the first optical radiation and the second optical radiation are separated by the Stokes wavelength.

In some embodiments, the dark pulse has a duration shorter than the acoustic phonon lifetime.

In some embodiments, the dark pulse has a duration of less than 2 ns.

In some embodiments, the dark pulse has a duration of less than 500 ps.

In other embodiments, the first optical radiation is a continuous wave (cw) Stokes wave.

In yet other embodiments, the first optical radiation is a quasi-cw Stokes wave.

In other embodiments, the first optical radiation is of sufficient duration so as to appear qausi-cw relative to the acoustic field of the optical fiber.

In still other embodiments, the first optical radiation has a duration of 1 to 10 µs.

In some embodiments, the first launching means has a pulse generator operable to control the duration of the dark pulse within the first optical radiation.

In some embodiments, the first launching means and the second launching means are connected at opposite ends of the optical fiber.

In some embodiments, the first launching means and the second launching means are connected at a first end of the optical fiber, and the second launching means is adapted to induce the second optical radiation to reflect off of a second end of the optical fiber.

In some embodiments, the system operates in a Brillouin loss mode.

In other embodiments, the system operates in a Brillouin gain mode.

A further aspect of the present invention provides a method for measuring strain or temperature in an optical fiber distributed sensor using a Brillouin Optical Time-Domain Analysis (BOTDA) system. The method has steps of: launching in a first direction in the optical fiber, a first optical radiation, the first optical radiation being interrupted by a dark pulse; launching a second optical radiation in an opposing direction in the optical fiber; measuring the Brillouin interaction of the first and second optical radiation during the dark pulse; and calculating a strain or temperature from the Brillouin interaction.

In some embodiments, the step of launching a first optical radiation, further comprises steps of: generating a pulse; using the pulse to control the launching of the first optical radiation.

In some embodiments, the step of launching the second optical radiation comprises launching the second optical radiation from the opposite end of the optical fiber from where the first optical radiation is launched.

In some embodiments, the step of launching the second optical radiation further comprises steps of: launching the second optical radiation from the same end as the first optical radiation, and reflecting the second optical radiation from the opposite end of the optical fiber.

BRIEF DESCRIPTION OF THE DRAWINGS

Further features and advantages of the present invention will become apparent from the following detailed description, taken in combination with the appended drawings, in which.

It will be noted that, throughout the appended drawings, like features are identified by like reference numerals.

DETAILED DESCRIPTION OF THE PREFERRED EMBODIMENT

Figure 1:
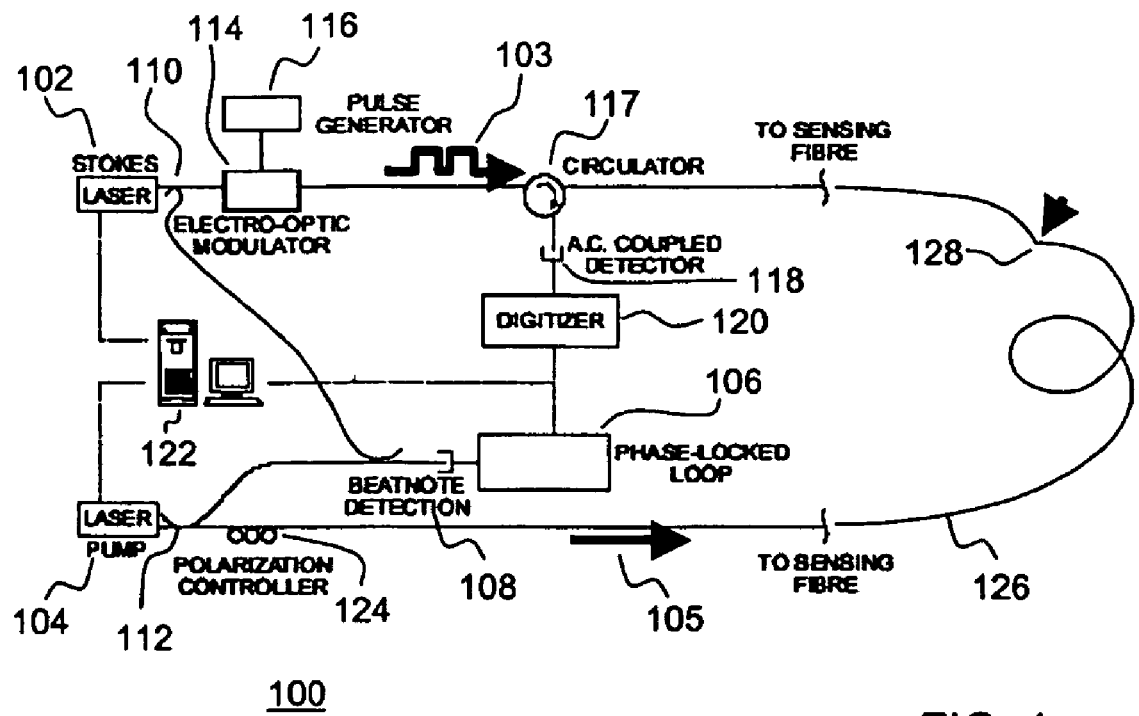
FIG. 1 is a schematic illustration showing an exemplary Brillouin optical time-domain analysis (BOTDA) distributed sensor system.

A Brillouin Optical Time-Domain Analysis (BOTDA) distributed sensor system operates by measuring the interaction intensity of two counterpropagating laser signals within a test fiber, the continuous wave (cw) pump at a frequency $v_0$, and the Stokes pulse at a lower frequency $v_0 - \Delta v$ (the Brillouin loss mode of operation is assumed). Power will be transferred from the cw pump to the Stokes pulse through an acoustic wave at any location within the test fiber where $\Delta v$ lies within the local Brillouin gain profile. The position of such a location may be determined relative to the end of the fiber from which the pulse is launched through conventional optical time domain reflectometry (OTDR) techniques. That is, the spectral information detected a time t after the launch of the Stokes pulse comes from a location ct/2n from the end of the fiber where c is the speed of light and n is the refractive index of the fiber. Therefore, t is the time required for the pulse to reach said location plus the time required for the information to propagate back to the detector.

Spatial resolution in a BOTDA system is determined by the duration of the Stokes pulse. This is because information from all locations simultaneously illuminated by the pulse will be detected simultaneously and, therefore, can not be temporally (or spatially) resolved. For this reason, it is desirable to use short pulses to enhance spatial resolution. Unfortunately, two deleterious effects result from the use of short pulses. The first is that the strength of the Brillouin interaction is drastically reduced when the pulse width is shorter than the acoustic wave lifetime ($\tau_A \sim 10$ ns). The second is that the optical spectrum of such a short pulse is quite broad (on the order of 100 MHz), considerably broader than the 30-50 MHz typical width of the Brillouin gain profile. As a result, the interaction spectrum is significantly broadened. This reduces the measurement accuracy of the Brillouin frequency and hence the strain or temperature measurement accuracy.

The behaviour of the optical signals in a BOTDA system is governed by the following coupled wave equations for the pump, Stokes and acoustic fields $E_p$, $E_s$ and $E_a$ respectively:

$$\frac{\partial E_p}{\partial t} + \frac{\partial E_p}{\partial z} = E_s E_a \quad (1)$$

$$\frac{\partial E_s}{\partial t} + \frac{\partial E_s}{\partial z} = E_p E_a^* \quad (2)$$

$$\frac{\partial E_a}{\partial t} + (1 + i\Delta) E_a = E_p E_s^* \quad (3)$$

where $\Delta$ is the frequency detuning parameter [See Lecoeuche, V., Webb, D. J., Pannell, C. N., and Jackson, D. A., "Transient response in high resolution Brillouin-based distributed sensing using probe pulses shorter than the acoustic relaxation time", Optics Letters, Vol. 25, No. 3, pp. 156-158, 2000].

It was noted by Lecoueche et al. [See Lecceuche, V., Webb, D. J., Pannell, C. N., and Jackson, D. A., "Transient response in high resolution Brillouin-based distributed sensing using probe pulses shorter than the acoustic relaxation time", Optics Letters, Vol. 25, No. 3, pp. 156-158, 2000] that because of the $E_s E_a$ term in equation (1), the scattering interaction ceases immediately upon the end of the pulse (i.e. when $E_s=0$) even given the finite $\tau_A$. It was suggested that the presence of a small cw component in the pulse signal could prepump the phonon field before the arrival of a pulse, resulting in increased scattering for the duration of the pulse only, an effect that had been observed previously [See Bao, X., Brown, A., DeMerchant, M., and Smith, J., "Characterization of the Brillouin-loss spectrum of single-mode fibers by use of very short (<10-ns) pulses", Optics Letters, Vol. 24, No. 8, pp. 510-512, 1999]. This would make practical the use of shorter optical pulses resulting in higher resolution, at the cost of some distortion of the optical signal.

If instead of a pulse of Stokes light (referred to herein as a "bright pulse"), a cw Stokes wave is used, power will be continuously transferred from the pump to the Stokes wave at any location where $\Delta v$ lies within the Brillouin spectrum of the fiber. This results in continual depletion of the pump. In other words, the pump will still be a DC signal, but at a lower overall power level determined by $\Delta v$.

Considering now the case where a cw Stokes wave (at a frequency such that Brillouin interaction takes place at some point in the fiber) is suddenly (and briefly) switched off, all interaction will also momentarily cease. The depletion of the pump wave will stop, resulting in an increase in the pump signal above its mean (partially depleted) level. The increase in pump signal occurs for the duration of the extinction of the Stokes light (referred to herein as a "dark pulse").

When the Stokes wave is restored, interaction is also resumed. Moreover, if the period of extinction is of sufficiently short duration (much shorter than the phonon lifetime) it is reasonable to assume that the acoustic field, $E_a$, will not be much changed. Therefore, the pump strength will return to its original (partially depleted) level after the passage of the dark pulse. Because scattering only ceases at the location where the Stokes signal is not present, spatially resolved Brillouin spectra may be obtained using dark pulses in an analogous manner to the conventional bright pulse method by merely inverting the received time domain signal. Furthermore, the optical spectrum of the quasi-cw Stokes wave is dominated by the narrow linewidth spectrum of the laser. Therefore, the received dark pulse spectra does not suffer from linewidth broadening.

A standard BOTDA system [See Brown, A. W., Smith, J. P., Bao, X., DeMerchant, M. D., and Bremner, T. W., "Brillouin scattering based distributed sensors for structural applications", Journal of Intelligent Materials Systems and Structures, Vol. 10, pp. 340-349, 1999] was set up as shown in FIG. 1 and used for the following experiments. The optical sources 102, 104 were two diode pumped Nd:YAG lasers operating at a nominal 1319 nm wavelength. The frequency difference between the lasers 102, 104 was set by a phase-locked loop 106. Optical taps 110, 112 sense the laser signals 103, 105 which are combined and detected by detector 108 for input into the phase-locked loop 106, which monitors the beat frequency between the two laser signals 103, 105. The phase-locked loop 106 then controls the optical sources 102, 104 directly to maintain the required frequency difference.

Figure 2:
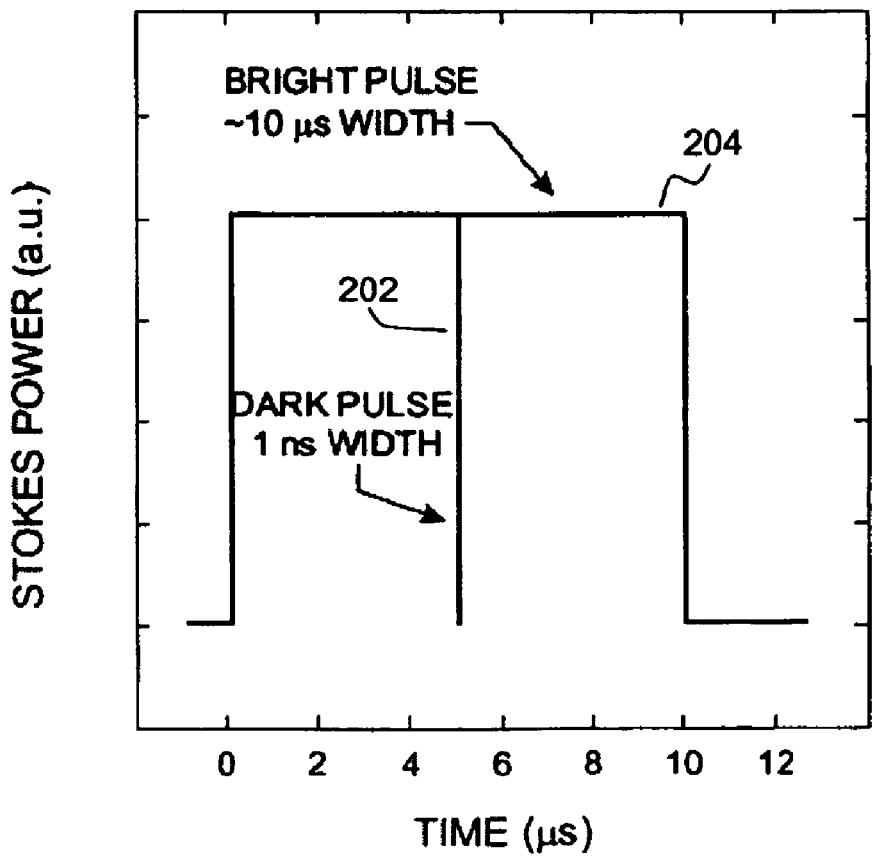
FIG. 2 is a graph showing a typical dark pulse of the present invention, within a quasi-cw Stokes bright pulse.

Thus in operation, the system of FIG. 1 launches a pump signal 105 from laser pump 104 into one end of the sensing fiber 126. A Stokes wave is generated by Stokes laser 102 and modulated by EOM 114 under the control of pulse generator 116. The resulting Stokes wave 103 is a quasi-cw Stokes bright pulse, having an embedded dark pulse (as illustrated in FIG. 2). The Brillouin interaction at location 128 on the sense fiber 126, propagates back through circulator 117 to detector 118 and digitizer 120. The digitized time-domain information is collected by controller 122 which also controls the lasers 102, 104. Controller 122 analyzes multiple measurements at different frequencies to generate the spectra as seen in FIG. 4 and FIG. 5, from which temperature and/or strain information can be derived.

A pump power of approximately 3 mW was used. With the electro-optic modulator (EOM) 114 set to extinction, an electrical pulse from the pulse generator 116 produced bright optical pulses of approximately 80 mW peak power. Conversely, adjusting the DC bias of the EOM for maximum transmission resulted in a dark optical pulse being generated on an 80 mW background. The extinction ratio of the modulator 114 is approximately 25 dB in either case. The power of the pump signal was monitored in the time domain by an α-coupled photodetector 118 that effectively removes the background cw signal, showing only the change in pump level due to the Brillouin interaction.

Figure 3:
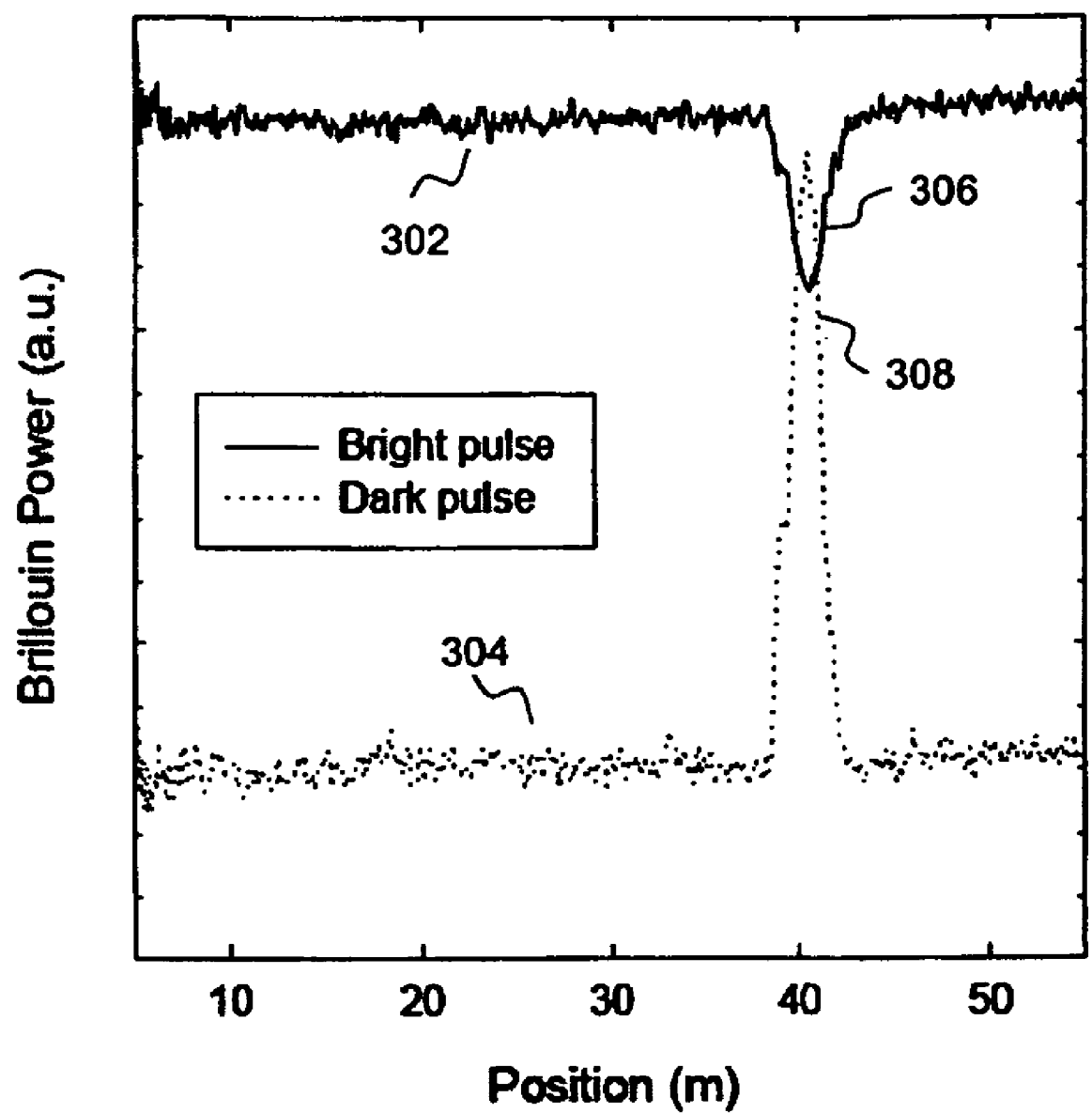
FIG. 3 is a graph showing typical time-domain waveforms of the present invention compared with a prior art BOTDA system.

A 100 m long test fiber 126 was used with a 2.54 m (100 in.) section anchored between a translation stage and a fixed block to provide a variable strain section 128. A further length was placed in a temperature controlled box. Brillouin spectra were taken using both bright and dark pulses of 2 ns duration. Averaging of 400 waveforms was used at each frequency. Time-domain waveforms for both cases, 306 (for bright pulse) and 308 (for dark pulse) are shown in FIG. 3 at a frequency difference of 13100 MHz. The strained section of fiber is clearly visible at 306, 308.

Figure 4:
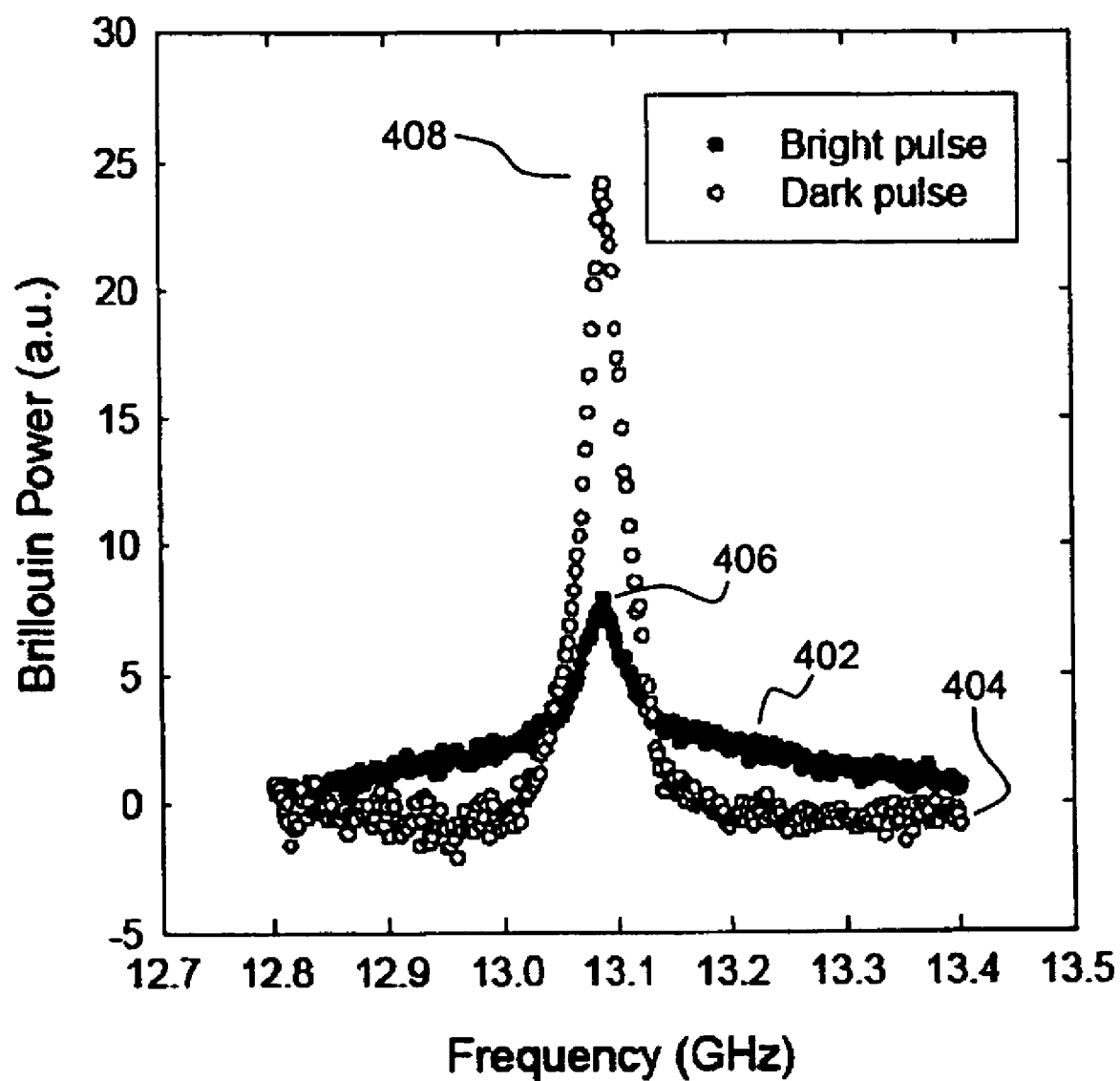
FIG. 4 is a graph showing typical Brillouin spectra taken with a 2 ns dark pulse of the present invention, compared with a prior art 2 ns bright pulse.
Figure 5:
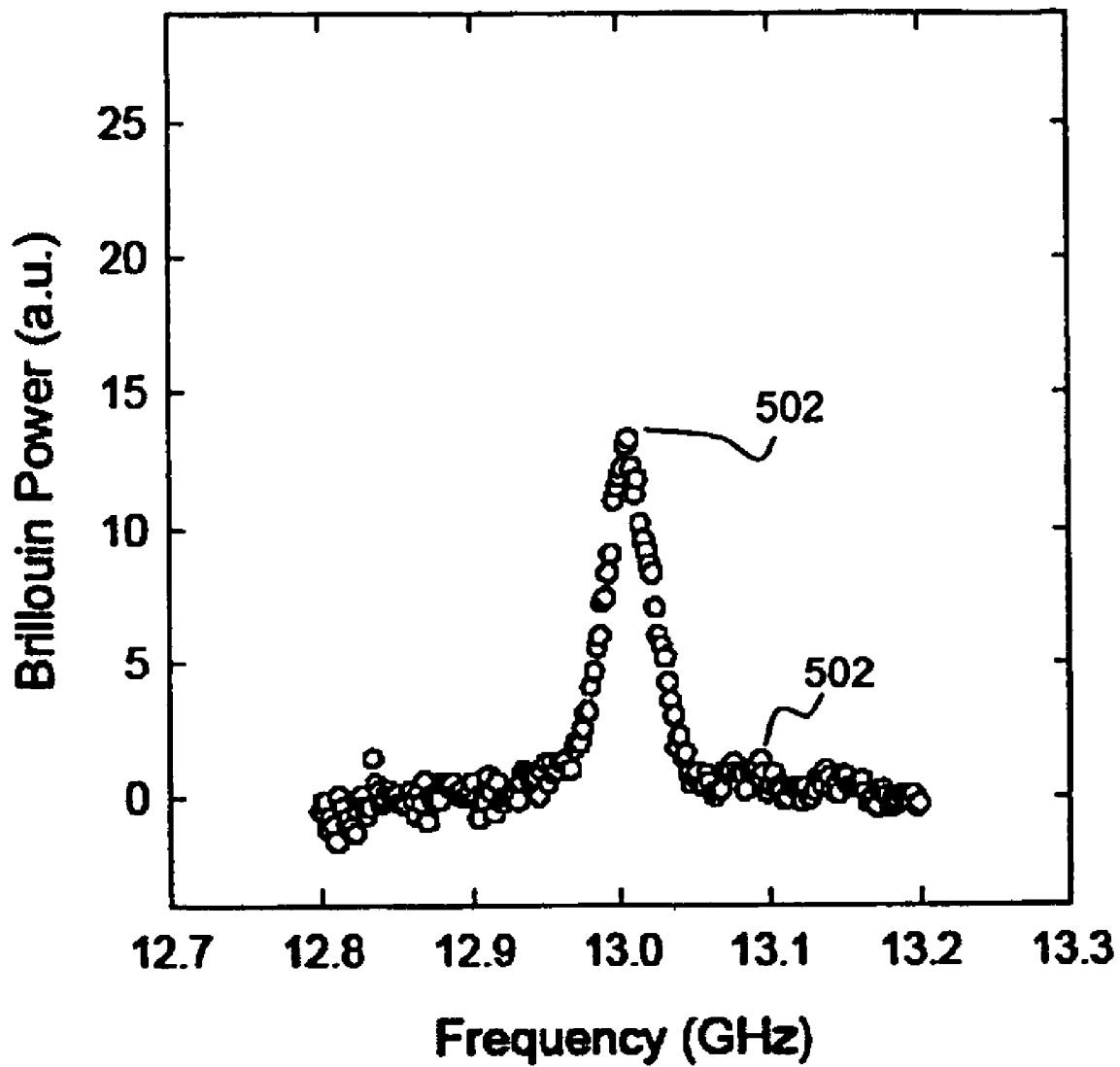
FIG. 5 is a graph showing typical Brillouin spectrum taken with a 500 ps dark pulse of the present invention.

The Brillouin spectra 402, 404 of the strained section 128 taken using the two methods are shown in FIG. 4. All test conditions other than the modulator 114 bias point were identical in the two experiments and the spectra 402, 404 are shown to the same scale, with the dark pulse spectrum 404 inverted for clarity. Both spectra 402, 404 were fit to a Lorentzian function to obtain the centre frequency.

It is evident from the time domain waveforms that there are two notable differences between the dark and bright pulse techniques: one, there is a simple inversion of the signal 304 which is easily handled by the data collecting software; two, the signal strength is much stronger. The spectra of FIG. 4 demonstrate the real advantage of the dark pulse technique. The spectrum 402 taken with the bright pulse shows poor signal-to-noise ratio (SNR) and a very broad linewidth (in the range of 200-300 MHz, albeit with a narrow central peak, as suggested previously [See Afshar V, S., Ferrier, G., Bao, X., and Chen, L., "Effect of the finite extinction ratio of an electro-optic modulator on the performance of distributed probe-pump Brillouin sensor systems", Optics Letters, Vol. 28, No. 16, pp. 1418-1420, 2003]). In contrast, the dark pulse spectrum 404 is much stronger (giving a much higher signal-to-noise ratio) and has a linewidth of about 40 MHz, the natural Brillouin linewidth of the fiber. The result of the narrower linewidth and stronger signal is that the measurement accuracy (defined here as the standard error of the centre frequency in fitting the spectrum) of the Brillouin frequency is +/−0.2 MHz (corresponding to a 4µε error, when measuring strain) for the dark pulses but only +/−0.7 MHz corresponding to 12µε error for bright pulses.

It is difficult to obtain bright pulse spectra using pulses much shorter than 2 ns due to sensitivity limitations of the test equipment. It was, however, possible to take spectra using dark pulses as short as 500 ps. with a typical spectrum shown in FIG. 5. Some degradation in the signal strength is noted, however this is attributed to bandwidth limitations of the test equipment rather than reduced interaction. With a ~500 ps pulse width, the strain measurements represented by these data have a spatial resolution of 50 mm which, it is believed, is the highest resolution ever reported with a BOTDA system. The strain error for this measurement was a mere 6µε. The measured linewidth of 40 MHz is also maintained.

It was not possible to demonstrate higher resolution because the pulse generator used was not capable of producing pulses shorter than 500 ps. It should be possible to make measurements with 100 ps or even shorter dark pulses using suitable equipment.

The dark pulse method of the present invention should be used with dark pulses of duration shorter than the acoustic lifetime (phonon lifetime). If longer pulses are used, the acoustic field may relax during the dark pulse and may take some time after light is restored to recover its original strength. While the acoustic field is at reduced strength, the Brillouin interaction is also reduced. This will manifest itself as an excessive risetime on the trailing edges of the time domain waveform. Depending on test conditions, this may or may not adversely affect measurement accuracy.

A second consideration is that the large cw power levels involved may result in stimulated Brillouin scattering (SBS) if long fibers are used. This may be mitigated by using dark pulses 202 embedded in a longer bright pulse. Such a pulse would appear as 202 in FIG. 2. The bright pulses are long enough to appear quasi-cw to the acoustic field but short enough to avoid the onset of SBS. Bright pulse (204) widths of 1-10 µs would be appropriate for suppressing SBS. The fiber would then be interrogated in multiple sections, with each section being that part of the fiber illuminated by the bright pulse 204. A similar quasi-cw approach can be used to avoid onset of SBS from the pump laser and allow higher powers to be used on both ends of the system. Another technique for reducing the effect of SBS in long optical fibers is to use of fibers with varying frequency shifts either by varying the initial strain or by concatenating different fibers.

In the method of the present invention, dark pulses can be used to overcome the acoustic lifetime barrier, which tends to limit the spatial resolution of bright-pulse-based BOTDA distributed sensor systems. Brillouin linewidth is pulse width independent for dark pulses, making arbitrary spatial resolutions possible. A 50 mm spatial resolution, limited only by the available equipment, has been demonstrated with a strain measurement accuracy of 6µε. A method for using dark pulses on long fibers is disclosed which reduces the possibility of SBS occurring due to the large cw optical powers that would otherwise be involved. The method of the present invention can be used for structural health monitoring of structures such as oil and gas pipelines, dams, nuclear power stations, bridges, aerospace applications and pressure vessels and is particularly applicable to safety-critical applications.

The present invention has been described using Brillouin loss mode of operation. It should be understood that the dark pulse technique of the present invention will work using Brillouin gain mode also.

BOTDA measurement systems measure the Brillouin interaction of counterpropagating laser signals in a test fiber. The present invention has been described in relation to a system using an optical fiber loop 126, with a first optical radiation 103 originating at one end of the fiber 126, and a second optical radiation originating at the other end of the fiber 126. The dark pulse technique of the present invention would work in single ended sense fiber systems as well, wherein the first and second optical radiations enter at one end of the fiber. The second optical radiation would counterpropagate after it is reflected at a reflecting end of the optical sense fiber. The dark pulse technique of the present invention would work with various other implementations of Brillouin measurement systems, including but not limited to, single laser source configurations, using an electro optic modulator to generate the interacting optical radiation.

The embodiment(s) of the invention described above is(are) intended to be exemplary only. The scope of the invention is therefore intended to be limited solely by the scope of the appended claims.

We claim:

1. A Brillouin Optical Time-Domain Analysis (BOTDA) distributed sensor system comprising:
   an optical fiber distributed sensor;
   a first launching means for launching a first optical radiation in a first direction in the optical fiber;
   a second launching means for launching a second optical radiation in an opposing direction in the optical fiber; and
   measurement means for measuring the Brillouin interaction of the first and second optical radiation with the acoustic phonon field of the optical fiber,
   wherein said first launching means is operable to interrupt said first optical radiation whereby a dark pulse is generated, said dark pulse being a duration of extinction of the first optical radiation, and
   wherein said measurement means measures the Brillouin interaction during said dark pulse.

2. A system as claimed in claim 1, wherein said first optical radiation and said second optical radiation are separated by the frequency of vibration of the acoustic phonon field in the optical fiber.

3. A system as claimed in claim 1, wherein said dark pulse has a duration shorter than the lifetime of the acoustic phonons in the optical fiber.

4. A system as claimed in claim 1, wherein said dark pulse has a duration of less than 2 ns.

5. A system as claimed in claim 1, wherein said dark pulse has a duration of less than 500 ps.

6. A system as claimed in claim 1, wherein said first optical radiation is a continuous wave radiation.

7. A system as claimed in claim 1, wherein said first optical radiation is a continuous wave radiation interrupted by a dark pulse.

8. A system as claimed in claim 1, wherein said first optical radiation is a pulsed radiation interrupted by a dark pulse.

9. A system as claimed in claim 8, wherein the pulses of said first optical radiation have a duration longer than the acoustic phonon lifetime whereby the said pulses appear as quasi-continuous waves to the acoustic phonon field.

10. A system as claimed in claim 1, wherein said first launching means comprises a pulse generator operable to control the duration of said dark pulse within said first optical radiation.

11. A system as claimed in claim 1, wherein said first launching means and said second launching means are connected at opposite ends of said optical fiber.

12. A system as claimed in claim 1, wherein said first launching means and said second launching means are both connected at a first end of said optical fiber, and said second launching means is adapted to induce said second optical radiation to reflect off of a second end of said optical fiber.

13. A system as claimed in claim 2, wherein said first optical radiation has a lower frequency than said second optical radiation whereby said system is operable in a Brillouin loss mode.

14. A system as claimed in claim 2, wherein said first optical radiation has a higher frequency than said second optical radiation whereby said system operates in a Brillouin gain mode.

15. A method for measuring strain or temperature in an optical fiber distributed sensor using a Brillouin Optical Time-Domain Analysis (BOTDA) system, the method comprising steps of:
   launching in a first direction in the optical fiber, a first optical radiation;
   interrupting said first optical radiation whereby a dark pulse is generated, said dark pulse being a duration of extinction of the first optical radiation;
   launching a second optical radiation in an opposing direction in the optical fiber;
   measuring the Brillouin interaction of the first and second optical radiation with the phonon field of the optical fiber during said dark pulse; and
   calculating a strain or temperature from the Brillouin interaction.

16. A method as claimed in claim 15, wherein said first optical radiation and said second optical radiation are separated by the frequency of vibration of the acoustic phonon field in the optical fiber.

17. A method as claimed in claim 15, wherein said dark pulse has a duration shorter than the lifetime of the acoustic phonons in the optical fiber.

18. A method as claimed in claim 15, wherein said dark pulse has a duration of less than 2 ns.

19. A method as claimed in claim 15, wherein said dark pulse has a duration of less than 500 ps.

20. A method as claimed in claim 15, wherein said first optical radiation is a continuous wave radiation.

21. A method as claimed in claim 15, wherein said first optical radiation is a continuous wave radiation interrupted by a dark pulse.

22. A method as claimed in claim 15, wherein said first optical radiation is a pulsed radiation interrupted by a dark pulse.

23. A method as claimed in claim 22, wherein the pulses of said first optical radiation have a duration longer than the acoustic phonon lifetime whereby the said pulses appear as quasi-continuous waves to the acoustic phonon pulses.

24. A method as claimed in claim 15, wherein said step of launching a first optical radiation, further comprises steps of: generating a pulse; using said pulse to control said launching of said first optical radiation.

25. A method as claimed in claim 15, wherein said step of launching said second optical radiation comprises launching said second optical radiation from the opposite end of said optical fiber from where said first optical radiation is launched.

26. A method as claimed in claim 15, wherein said step of launching said second optical radiation further comprises steps of: launching said second optical radiation from the same end as said first optical radiation, and reflecting said second optical radiation from the opposite end of said optical fiber.

27. A method as claimed in claim 16, wherein said first optical radiation has a lower frequency than said second optical radiation whereby said system operates in a Brillouin loss mode.

28. A method as claimed in claim 16, wherein said first optical radiation has a higher frequency than said second optical radiation whereby said system operates in a Brillouin gain mode.

29. A system as claimed in claim 1, wherein said first launching means is operable to reduce said first optical radiation.

30. A method as claimed in claim 15 wherein in the step of interrupting said first optical radiation, said first optical radiation is reduced.

* * * * *